United States Patent
Liang et al.

(10) Patent No.: US 12,406,688 B2
(45) Date of Patent: Sep. 2, 2025

(54) EMBEDDED ELECTROMAGNETIC INTERFERENCE SHIELD

(71) Applicant: INTERNATIONAL BUSINESS MACHINES CORPORATION, Armonk, NY (US)

(72) Inventors: Jason Liang, Campbell, CA (US); Icko E. T. Iben, Santa Clara, CA (US); Hoodin Hamidi, San Francisco, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/332,334

(22) Filed: Jun. 9, 2023

(65) Prior Publication Data

US 2024/0412758 A1    Dec. 12, 2024

(51) Int. Cl.
G11B 5/11    (2006.01)

(52) U.S. Cl.
CPC .............. G11B 5/11 (2013.01); G11B 5/112 (2013.01)

(58) Field of Classification Search
None
See application file for complete search history.

(56) References Cited

U.S. PATENT DOCUMENTS

| | | | |
|---|---|---|---|
| 3,252,153 A * | 5/1966 | Mos | G11B 5/265 |
| 3,824,622 A * | 7/1974 | Kashimoto | G11B 5/29 360/125.01 |
| 5,134,534 A * | 7/1992 | Sasaki | G11B 5/29 360/125.33 |
| 6,246,553 B1 | 6/2001 | Biskeborn | |
| 6,760,199 B2 | 7/2004 | Biskeborn | |
| 6,781,792 B2 | 8/2004 | Biskeborn | |
| 7,196,866 B2 | 3/2007 | Poorman et al. | |
| 7,684,148 B2 | 3/2010 | Biskeborn | |
| 7,911,743 B2 | 3/2011 | Hachisuka et al. | |
| 9,406,319 B1 * | 8/2016 | Biskeborn | G11B 5/115 |
| 9,747,931 B1 * | 8/2017 | Biskeborn | G11B 5/00813 |
| 9,837,104 B1 | 12/2017 | Biskeborn | |
| 9,997,180 B1 * | 6/2018 | Biskeborn | G11B 5/398 |
| 10,832,712 B1 * | 11/2020 | Seagle | G11B 5/00817 |
| 11,074,930 B1 | 7/2021 | Seagle | |
| 11,087,782 B1 * | 8/2021 | Brown | G11B 5/2457 |
| 11,114,117 B1 | 9/2021 | Seagle et al. | |
| 11,646,054 B2 * | 5/2023 | Le | G11B 5/112 360/121 |

(Continued)

OTHER PUBLICATIONS

P. Lorrain, et al., "Electromagnetic Fields and Waves", W.H. Freeman and Company, 1970, pp. 475-480.

(Continued)

*Primary Examiner* — William J Klimowicz
(74) *Attorney, Agent, or Firm* — KONRAD, RAYNES, DAVDA & VICTOR LLP; Alan S. Raynes

(57) ABSTRACT

Provided are devices for use in a magnetic tape head, a magnetic tape head, and methods for forming the same. A device includes a chiplet including at least one of a reader and a writer. The device also includes an electromagnetic interference (EMI) shield embedded in the chiplet. The EMI shield is configured to inhibit electromagnetic interference during operation of the at least one of the reader and the writer.

20 Claims, 5 Drawing Sheets

(56) References Cited

U.S. PATENT DOCUMENTS

| | | | |
|---|---|---|---|
| 11,676,626 B1* | 6/2023 | Biskeborn | G11B 5/00817 360/110 |
| 11,682,421 B2* | 6/2023 | Seagle | G11B 5/3977 360/128 |
| 2003/0039069 A1 | 2/2003 | Biskeborn | |
| 2004/0136119 A1* | 7/2004 | Kirschenbaum | G11B 5/332 |
| 2005/0134999 A1 | 6/2005 | Poorman et al. | |
| 2006/0039082 A1* | 2/2006 | Biskeborn | G11B 5/4893 360/129 |
| 2007/0109681 A1* | 5/2007 | Biskeborn | G11B 5/2652 |
| 2008/0112076 A1* | 5/2008 | Biskeborn | G11B 20/10481 360/122 |
| 2008/0170335 A1* | 7/2008 | Iben | G11B 5/11 |
| 2008/0221981 A1* | 9/2008 | Biskeborn | G11B 5/3106 705/14.14 |
| 2009/0059439 A1 | 3/2009 | Hachisuka et al. | |
| 2011/0085265 A1* | 4/2011 | Biskeborn | G11B 5/0083 |
| 2014/0063646 A1* | 3/2014 | Biskeborn | G11B 5/3967 360/75 |
| 2014/0327983 A1* | 11/2014 | Biskeborn | G11B 5/00817 360/70 |
| 2017/0309302 A1 | 10/2017 | Biskeborn et al. | |
| 2022/0415344 A1* | 12/2022 | Seagle | G11B 5/3977 |

OTHER PUBLICATIONS

R.M. Bozorth, "Ferromagnetism", IEEE Press, 1993, ISBN 0-7803-1032-2, p. 107.

\* cited by examiner

EMBEDDED ELECTROMAGNETIC INTERFERENCE SHIELD

BACKGROUND OF THE INVENTION

1. Field of the Invention

Provided are devices and methods including an embedded electromagnetic interference (EMI) shield within a chiplet to enable improved performance.

2. Description of the Related Art

In magnetic storage systems, data is read from and written onto magnetic recording media utilizing magnetic read transducer elements (known as readers) and write transducer elements (known as writers) formed on a head. Data is written on the magnetic recording media such as a tape by moving a writer to a position over the media where the data is to be stored. The magnetic recording transducer (a writer) generates a magnetic field, which encodes the data into the magnetic media. Data is read from the media by similarly positioning the reader and sensing the magnetic field of the magnetic media. Read and write operations may be independently synchronized with the movement of the media to ensure that the data can be read from and written to the desired location on the media. Through the use of, for example, a servo system, closed loop track following functions allow for accurate placement of the writer or reader elements on a tape media as data is transferred to or from the tape.

The magnetic transducer elements for more than one tape head may be formed on a wafer substrate. Arrays of magnetic transducer elements may be formed in rows on the wafer substrate, which is cut to separate the rows of transducer arrays into chiplets, each having one or more arrays of transducers (readers and/or writers). A tape head may be formed by securing a chiplet on a supporting member (also known as a base) such as a U-beam which gives the tape head structural integrity. The chiplet coupled to the base constitutes a module, and a tape head may include one or more modules.

A tape head typically comprises a group of writers and readers, usually on separate modules. During the write operation, the writers write to the tape and the readers read back and validate the data. Electromagnetic interference comprises signals that cause unwanted interactions. For example, as a result of AC current flowing in a writer module, EMI can be generated and adversely affect the read-back signal, resulting in higher noise and a lower signal-to-noise ratio (SNR). To combat this issue, a physical shield formed as a 100 μm thick Al (Aluminum) body has been coupled to the write cables connected to a module to inhibit EMI between adjacent modules in the tape head.

The physical shield is positioned to extend between adjacent modules to provide EMI shielding.

SUMMARY

Provided is a device for use in a magnetic tape head. The device includes a chiplet including at least one of a reader and a writer. The device also includes an electromagnetic interference (EMI) shield embedded in the chiplet. The EMI shield is configured to inhibit electromagnetic interference during operation of the at least one of the reader and the writer.

Also provided is a magnetic tape head including a plurality of modules. The modules each contain at least one of a reader and a writer positioned therein. At least one of the plurality of modules includes an EMI shield embedded therein, the electromagnetic shield configured to inhibit electromagnetic interference between adjacent modules of the plurality of modules.

Also provided is a method for forming a device for use in a magnetic tape head. The method includes providing a substrate and forming an undercoat on the substrate. The method also includes forming at least one of a reader and a writer on the undercoat. The undercoat is positioned between the substrate and the at least one of the reader and the writer. The method also includes forming an overcoat on the at least one of the reader and the writer. The at least one of the reader and the write is positioned between the undercoat and the overcoat. The method further includes embedding an EMI shield in at least one of the undercoat and the overcoat. The EMI shield is configured to inhibit interference during operation of the at least one of the reader and the writer.

DETAILED DESCRIPTION

Figure 1:
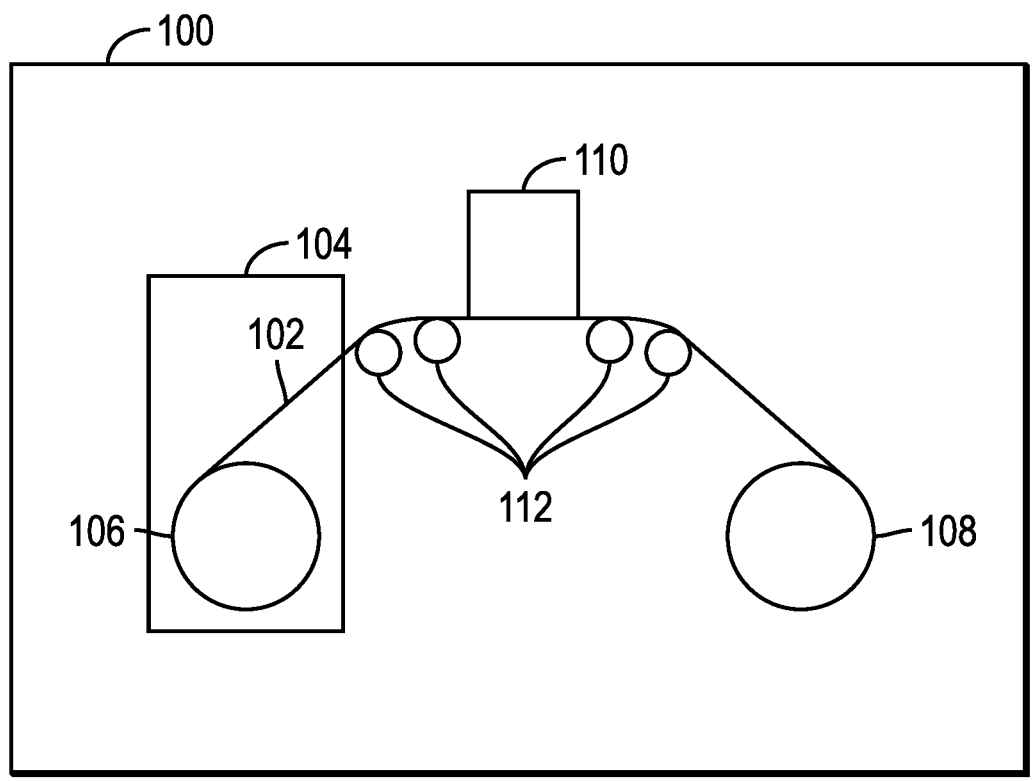
FIG. 1 illustrates a tape drive device in which embodiments are implemented.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The description herein provides examples of embodiments of the invention, and variations and substitutions may be made in other embodiments. Several examples will now be provided to further clarify various embodiments of the present disclosure:

Example 1: A device for use in a magnetic tape head comprising a chiplet including at least one of a reader and a writer. The device also includes an electromagnetic interference shield embedded in the chiplet, the electromagnetic interference shield configured to inhibit electromagnetic interference during operation of the at least one of the reader and the writer. By utilizing an embedded EMI shield instead of a separate, physical shield positioned adjacent to a chiplet, a gap-to-gap distance between adjacent chiplets in a tape head may advantageously be decreased, permitting a higher drive capacity. Providing an embedded EMI shield in the chiplet at a position close to a writer or reader may increase its effectiveness by minimizing radiation passing around the embedded EMI shield when compared with a shield placed at a greater distance away from the writer or reader.

Example 2: The limitations of any of Examples 1 and 3-13, the chiplet comprising a substrate on which the at least one of the reader and the writer is positioned. The chiplet also comprises an undercoat material on the substrate, the undercoat material positioned between the substrate and the at least one of the reader and the writer. In addition, the electromagnetic interference shield is embedded in the undercoat material. Embodiments may have advantageous processing efficiencies and/or shielding properties by positioning the electromagnetic shield in the undercoat material.

Example 3: The limitations of any of Examples 1-2 and 4-13, wherein the chiplet further comprises a servo including a servo shield, and wherein the electromagnetic interference shield comprises a common material as the servo shield. By utilizing a common material that is already being deposited as part of the servo structure, more efficient formation of the electromagnetic interference shield may be accomplished because deposition of a different material for the shield may be avoided.

Example 4: The limitations of any of Examples 1-3 and 5-13, wherein the chiplet further comprises a servo including a servo shield, and wherein the electromagnetic interference shield comprises an extension of the servo shield. By extending the servo shield material, more efficient formation of the electromagnetic interference shield may be accomplished by using the same operation used for forming the servo shield.

Example 5: The limitations of any of Examples 1-4 and 6-13, wherein the chiplet comprises a substrate on which the at least one of the reader and the writer is positioned. The chiplet also includes an undercoat material on the substrate, the undercoat material positioned between the substrate and the at least one of the reader and the writer. The chiplet also includes an overcoat material on the substrate, the at least one of the reader and the writer positioned between the overcoat material and the undercoat material, wherein the electromagnetic interference shield is embedded in the overcoat material. Advantageous shielding may be obtained in certain embodiments by positioning the electromagnetic interference shield in an overcoat material on a chiplet, depending on features such as, for example, the layout of multiple chiplets in a tape head.

Example 6: The limitations of any of Examples 1-5 and 7-13, wherein the chiplet includes an air bearing surface over which a magnetic tape may move during reader and writer operation, and wherein the electromagnetic interference shield extends to the air bearing surface. By extending the electromagnetic interference shield to the air bearing surface, advantages in electromagnetic interference shielding may be obtained due to the shield extending in a manner that is closer to the readers and/or writers at the air bearing surface.

Example 7: The limitations of any of Examples 1-6 and 8-13, the chiplet comprising a substrate, wherein the electromagnetic interference shield is positioned to cover the at least one of the reader and the writer between the substrate and the at least one of the reader and the writer. By positioning the electromagnetic interference shield to cover the at least one of the reader and the writer, advantages in electromagnetic interference shielding may be obtained due to the shield extending in a manner that is closer to the readers and/or writers. Placing the embedded EMI shield in close proximity to the writer, for example, may increase its effectiveness by minimizing radiation passing from the writer around the embedded EMI shield, when compared to a shield located a greater distance away. Also, placing the embedded EMI shield in close proximity to the reader, for example, may increase its effectiveness because less radiation may pass around the embedded EMI shield to interact with the reader, when compared to a shield located at a greater distance away from the reader. It is advantageous to place the shield in close proximity to at least one of the writers and readers because the areal spread of radiation increases as the square of the distance from the radiating source, so a shield with a significantly smaller surface area may be utilized the closer it is to the at least one of the writers and readers.

Example 8: The limitations of any of Examples 1-7 and 9-13, where the chiplet further comprises a servo including a servo shield positioned between the substrate and the at least one of the reader and the writer, and wherein the electromagnetic interference shield comprises an extension of the servo shield. By extending the servo shield material, more efficient formation of the electromagnetic interference shield may be accomplished by using the same operation used for forming the servo shield while also providing improved electromagnetic interference shielding by covering the at least one of the reader and the writer.

Example 9: The limitations of any of Examples 1-8 and 10-13, wherein the chiplet defines a height, and the electromagnetic interference shield extends the height of the chiplet. By extending the electromagnetic interference shield to the height of the chiplet, advantages in electromagnetic interference shielding may be found because any features residing in the height of the chiplet may be shielded.

Example 10: The limitations of any of Examples 1-9 and 11-13, where chiplet defines a depth, and the electromagnetic interference shield extends the depth of the chiplet. By extending the electromagnetic interference shield to the depth of the chiplet, advantages in electromagnetic interference shielding may be found because any features residing in the depth of the chiplet may be shielded.

Example 11: The limitations of any of Examples 1-10 and 12-13, wherein the electromagnetic interference shield embedded in the chiplet is electrically coupled to an electrical ground. By electrically coupling the electromagnetic interference shield to an electrical ground, advantages in device reliability may be obtained.

Example 12: The limitations of any of Examples 1-11 and 13, where the chiplet is coupled to a support to form a module. The module may be advantageously used for tape head formation.

Example 13: The limitations of any of claims 1-12, where the device comprises a plurality of additional modules. At least one of the additional modules comprises a chiplet including at least one of a reader and a writer, and an electromagnetic interference shield embedded in the chiplet. The electromagnetic interference shield is configured to inhibit electromagnetic interference during operation of the at least one of the reader and the writer. The module and the additional modules are coupled together to form the magnetic tape head. Utilizing multiple modules including chiplets having embedded electromagnetic interference shields advantageously permits a tape head having a smaller gap-to-gap distance between adjacent modules of readers and/or writers in the tape head, permitting a higher drive capacity.

Example 14: A magnetic tape head comprising a plurality of modules, the modules each including at least one of a reader and a writer positioned therein. At least one of the plurality of modules of the magnetic tape head includes an electromagnetic interference shield embedded therein. The electromagnetic interference shield is configured to inhibit electromagnetic interference between adjacent modules of the plurality of modules. Including an embedded electromagnetic interference shield advantageously permits a tape head having a smaller gap to gap distance between adjacent modules of readers and/or writers in the tape head, permitting higher drive capacity.

Example 15: The limitations of any of claims 14 and 16-17, where the at least one of the plurality of modules of the tape head comprises a substrate and an undercoat on the substrate. The undercoat is positioned between the substrate and the at least one of the reader and the writer. The at least one of the plurality of modules of the tape head also comprises an overcoat on the substrate. The at least one of the writer and the reader is positioned between the undercoat and the overcoat. In addition, the at least one of the plurality of modules including the electromagnetic interference shield embedded therein is configured with the electromagnetic interference shield positioned in at least one of the undercoat and the overcoat. By positioning the electromagnetic interference shield in at least one of the undercoat and the overcoat, the positional flexibility allows for the shield to be located at the optimal position with respect to any adjacent modules to ensure advantageous shielding between modules.

Example 16: The limitations of claims 14-15 and 17, where the at least one of the plurality of modules in the tape head that includes the electromagnetic interference shield embedded therein further comprises a servo including a servo shield, and wherein the electromagnetic interference shield comprises a common material as the servo shield. By utilizing a common material that is already being deposited part of the servo structure, more efficient formation of the electromagnetic shield fabrication may be accomplished because an additional deposition of a different material for the EMI shield may be avoided.

Example 17: The limitations of claims 14-16, where the at least one of the plurality of modules of the tape head that includes the electromagnetic interference shield embedded therein further comprises a servo including a servo shield, and wherein the electromagnetic interference shield comprises an extension of the servo shield. By extending the servo shield material, more efficient formation of the electromagnetic interference shield may be accomplished by using the same operation used for forming the servo shield.

Example 18: A method for forming a device for use in a magnetic tape head, comprising providing a substrate and forming an undercoat on the substrate. The method also includes forming at least one of a reader and a writer on the undercoat, wherein the undercoat is positioned between the substrate and the at least one of the reader and the writer. The method also includes forming an overcoat on the at least one of the reader and the writer, wherein the at least one of the reader and the writer is positioned between the undercoat and the overcoat. The method also includes embedding an electromagnetic interference shield in at least one of the undercoat and the overcoat, the electromagnetic interference shield configured to inhibit electromagnetic interference during operation of the at least one of the reader and the writer. By positioning the electromagnetic interference shield in at least one of the undercoat layer and the overcoat layer, the positional flexibility allows for the shield to be located at the optimal position with respect to any adjacent modules to ensure advantageous shielding between modules.

Example 19: The limitations of Examples 18 and 20, where the method comprises embedding the electromagnetic interference shield in the undercoat. Embodiments may have advantageous processing efficiencies and/or shielding properties by positioning the electromagnetic shield in the undercoat material.

Example 20: The limitations of Examples 18-19, the method further comprising forming a servo between the substrate and the at least one of the reader and the writer. The servo includes including a servo shield; formed using a deposition process; the electromagnetic interference shield being formed during the deposition process for forming the servo shield. Embodiments permit more efficient formation of the electromagnetic interference shield by utilizing the deposition process used for forming the servo shield.

Certain embodiments relate to providing an embedded EMI shield in a module of a tape head. By providing an embedded EMI shield in close proximity to the readers and writers, the physical dimensions of the shield may be decreased. The decrease in dimensions of the shield may in turn enable the modules to be located closer to one another which may be advantageous for the design of the head.

Placing the embedded EMI shield in close proximity to the writer may increase its effectiveness by minimizing radiation passing around the embedded EMI shield when compared to the amount of radiation that may pass around a shield placed a greater distance away from the writer. Also, placing the embedded EMI shield in close proximity to the reader may increase its effectiveness by minimizing radiation reaching the reader when compared to the amount of radiation that may pass around a shield located at a greater distance from the reader. The effectiveness of placing the shield in close proximity to a source or radiating element (such as, for example, a writer) and a receiving element (such as, for example, a reader) can be understood by noting that the areal spread of radiation increases as the square of the distance from the radiating source, so a shield with a significantly smaller surface area may be utilized the closer it is to the source or receiver.

FIG. 1 illustrates an embodiment of a tape drive 100 to read and write with respect to a magnetic tape 102 of a magnetic tape cartridge 104. The magnetic tape cartridge 104 comprises a length of magnetic tape 102 wound on one or two reels 106, 108. By way of example, the magnetic tape cartridge 104 may comprise a single reel tape, such as adhering to the Linear Tape Open (LTO) format. An example of a tape drive 100 is the International Business Machines Corporation TS1160 Tape Drive. Various implementations of the tape cartridge 104 and tape drive 100 may also be used, including, but not limited to, LTO type tape drives.

The tape drive 100 may further include one or more controllers (not shown) to operate the tape drive 100 in accordance with commands received from a host system. The tape drive 100 may comprise a standalone unit or comprise a part of a tape library or other subsystem. The tape drive 100 may be coupled to a host system directly, through a library, or over a network.

The tape cartridge 104 may be inserted in the tape drive 100 and loaded by the tape drive 100 mechanisms so that one or more readers and/or writers on a tape head 110 read and/or write information in the form of signals with respect to the magnetic tape 102 as the tape is moved by one or more motors (not shown) which rotate the reels 106, 108. Tape guide rollers 112 guide the tape 102 across the tape head 110 to stabilize the positioning of the tape 102 with respect to the tape head 110 to reduce position error signals (PES). The magnetic tape 102 typically comprises a plurality of parallel tracks, or groups of tracks. In some formats, such as the LTO format, above, the tracks are arranged in a serpentine back and forth pattern of separate wraps, as is known to those of skill in the art.

Figure 2:
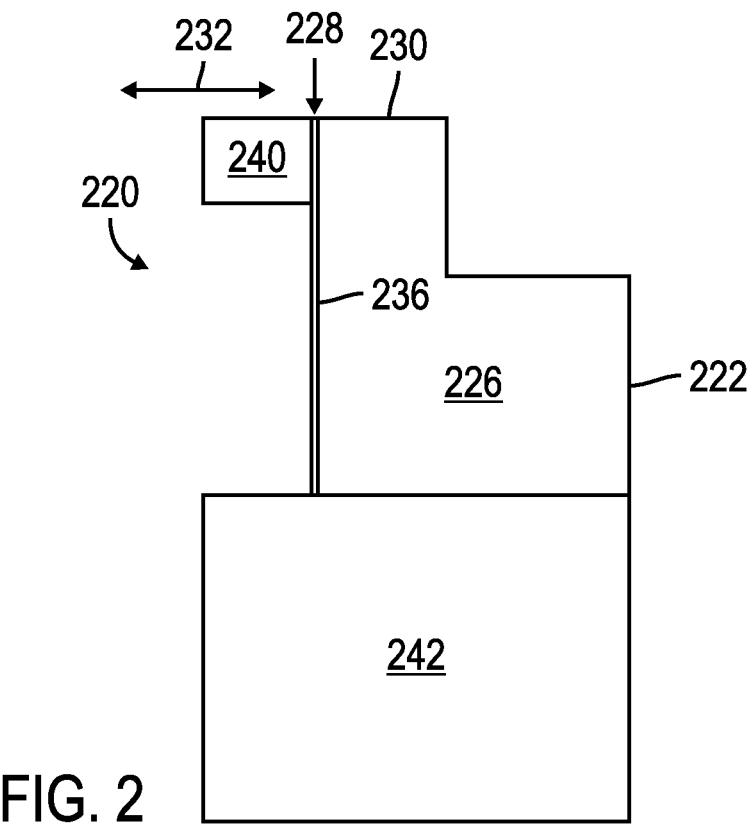
FIG. 2 illustrates a module in accordance with certain embodiments.

FIG. 2 illustrates a module 220 for use in a tape head in accordance with certain embodiments. Magnetic tape may move in forward or reverse over the air bearing surface 230 of the module 220 along a direction indicated by double ended arrow 232. The terms "tape bearing surface" do not necessarily mean that the tape is in physical contact with the surface 230. All, a portion of, or none of the tape may be in physical contact with the surface 230, constantly or intermittently, with other portions of the tape riding or flying above the surface 230 on a layer of air. As a result, the surface 230 may also be called an air bearing surface 230.

The module 220 includes a chiplet 222 mounted on a base 242 which may have a U-beam structure through which wiring may be attached to the module 220. The chiplet 222 includes a wafer portion or substrate 226 on which a plurality of layers are positioned. The substrate 226 may be formed from any suitable material including, but not limited to, a hard material such as AlTiC, which is a ceramic composite material including insulative aluminum oxide ($Al_2O_3$) plus conductive titanium carbide (TiC).

The module 220 includes an active region location indicated by arrow 228 in which any suitable writers and/or readers may be positioned. The active region location pointed to by the arrow 228 on the module 220 is very narrow in the view illustrated in FIG. 2.

The module 220 also includes an EMI shield 236 embedded in the chiplet 222 for EMI protection at a position close to the active region pointed to by the arrow 228. As seen in FIG. 2 the EMI shield 236 is a vertical line that extends toward the bottom of the chiplet 222 on the base 242. In various embodiments the EMI shield 236 may extend to the bottom of the chiplet 222, to the top of the chiplet 222, to both the bottom and the top (entire height) of the chiplet 222, or to neither the top nor the bottom of the chiplet 222. Similarly, in various embodiments the EMI shield 236 may extend within the part of the depth or through the entire depth of the chiplet 222. In certain embodiments the entire area of the chiplet 222 may be covered by the EMI shield 236 embedded therein. Depending on the positioning of the wiring, bonding pads, and writers and readers, having the EMI shield 236 extend the length of the chiplet can provide improved EMI protection, because the EMI shield 236 can extend very close to or at the air bearing surface 230 and cover the writers and/or readers, and may also cover wiring, wiring traces, and bonding pads. When utilizing a separate, physical EMI shield care must be taken to ensure that the shield does not extend to or over the level of the air bearing surface to avoid damaging the tape and air bearing surface during operation. As a result, the separate physical EMI shield is positioned at a level below that of the air bearing surface and at least some of the readers/and or writer are not fully covered by the shield.

In certain embodiments the EMI shield 236 embedded in the chiplet 222 may be brought into electrical contact with the substrate 226. In certain embodiments the EMI shield 236 embedded in the chiplet 222 may be electrically coupled to an external ground. Such a connection may act to inhibit tribocharging and corrosion. In certain embodiments the EMI shield 236 embedded in the chiplet 222 may be brought into electrical contact with the substrate 226.

The EMI shield 236 may be formed from any suitable EMI shielding material, including, but not limited to, permalloy, an alloy of nickel (Ni) and iron (Fe), for example, 80:20 (about 80% Ni and about 20% Fe), or 55:45 (about 55% Ni and about 45% Fe). Another example of a possible suitable EMI shielding material is mumetal, an alloy of Ni and Fe with other metals, for example, an alloy including 80% Ni, 12-15% Fe, and 5% Mo (molybdenum) or an alloy including 77% Ni, 16% Fe, 5% Cu (copper), and 2% Cr (chromium) or 2% Mo. Other high permeability materials may also be used. The EMI shield 236 may include a single layer or multiple layers of different materials or the same material to achieve sufficient shielding. The EMI shield 236 when using a high permeability material such as permalloy may in certain embodiments have a thickness of about 2000 nm. Depending on factors including, for example, the materials used, frequency and spacing, certain embodiments may provide adequate EMI shielding using an embedded EMI shield having a thickness in the range of about 500 nm to about 5000 nm. Other embodiments may utilize an embedded EMI shield that is less than 500 nm or greater than 5000 nm in thickness.

Using Maxwell's Equations, one can calculate the penetration of an electromagnetic field into the metal. The skin depth, δ, or penetration depth of an EMI field operating at a frequency f, into a material with a conductivity σ and a permeability $\mu_r$, relative to permeability in vacuum, $\mu_o$ ($=4\pi \times 10^{-6}$ N·A$^{-2}$), is calculated as:

$$\delta = \sqrt{\frac{2}{2\pi f \sigma \mu_r \mu_o}}. \quad (1)$$

The magnitude of the EMI field, E, decreases exponentially with depth, x, into the material:

$$E = E_o e^{-x/\delta}. \quad (2)$$

Equation 1 shows that the higher the conductivity and permeability of a material, the shallower the depth of the radiation into the material, there increasing the effectiveness of the material as an EMI shield. As noted above, skin depth relates to the measure of the penetration of an electromagnetic wave into a material. High permeability materials like permalloy and mumetal have low skin depth and are useful as EMI shield materials. Permalloy is an effective soft magnetic material used in tape heads. Two permalloy compositions commonly used in Tape Heads are 80:20 Ni:Fe and 45:55 Ni:Fe. At about 25° C., the bulk conductivity (1/resistivity) for 80:20 Ni:Fe and 45:55 Ni:Fe are about 8.3 and 2.5×10$^6$ mho/m respectively. The relative permeability of 80:20 Ni:Fe and is between about 200 and 1000, and for 45:55 Ni:Fe is around 2000. Using Equation 1, the skin depth for Al, Cu, and permalloy alloys of 80:20 Ni:Fe and 45:55 Ni:Fe are given in Table 1.

TABLE 1

Skin depth of various metals and Ni:Fe alloys calculated using Equation 1.

| Material | σ (mho/m) | Frequency μ$_r$ | 1 MHz δ (μm) | 25 MHz δ (μm) |
|---|---|---|---|---|
| Aluminum | 35.4 × 10$^6$ | 1 | 84.6 | 16.9 |
| Copper | 58.0 × 10$^6$ | 1 | 66.0 | 13.2 |
| 80:20 Ni:Fe, case1 | 8.3 × 10$^6$ | 200 | 12.3 | 2.5 |
| 80:20 Ni:Fe, case2 | 8.3 × 10$^6$ | 1000 | 5.5 | 1.1 |
| 45:55 Ni:Fe | 2.5 × 10$^6$ | 2000 | 7.1 | 1.4 |

In certain embodiments, effective EMI shielding may be achieved with a shield thickness of about 2 to 3 skin depths. Other embodiments may utilize other thicknesses of less than 2 or greater than 3 skin depths. Placing the embedded EMI shield in close proximity to a writer or reader may increase its effectiveness by minimizing radiation passing around the embedded EMI shield when compared with a shield placed at a greater distance away. As noted above, the areal spread of radiation increases as the square of the distance from the radiating source.

Replacing a non-embedded physical EMI shield such as that formed from Al with a thinner, embedded EMI shield utilizing a high permeability material may permit the gap-to-gap distance between modules in a tape head to be made smaller, which permits higher drive capacity.

As illustrated in FIG. 2, the module 220 also includes a closure 240 positioned on the left side, so that the active region in the chiplet 222 is between the substrate 226 and the closure 240. The closure 240 may be formed from any suitable material including, but not limited to, a hard material such as that used for the substrate 226. The closure 240 may be formed as a separate part that is coupled to the layers formed on the substrate 226 using any suitable mechanism including, but not limited to, an adhesive.

Figure 3:
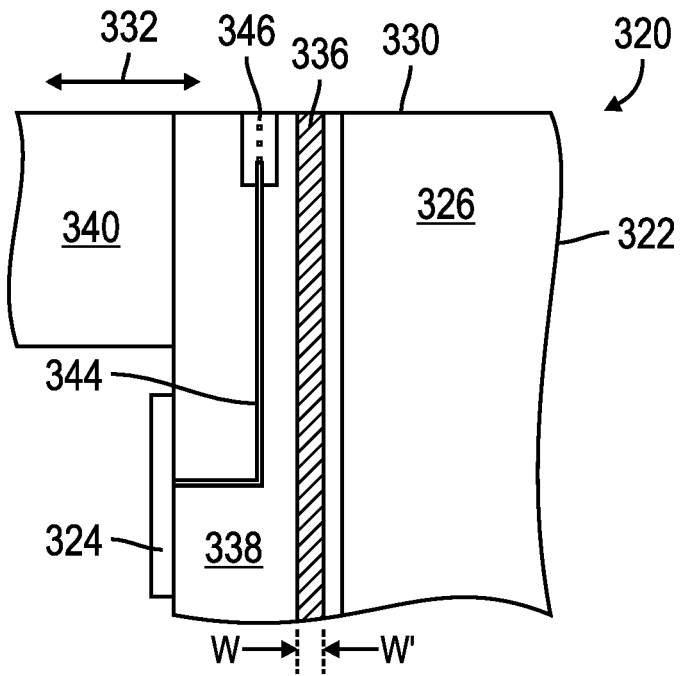
FIG. 3 illustrates a portion of a chiplet in accordance with certain embodiments.

FIG. 3 illustrates a cross-sectional view of portion of module 320 showing certain layers in chiplet 322 in accordance with certain embodiments. The chiplet 322 may be mounted on a base (not shown) through which wiring may be attached to the module 320 at, for example, bonding pad 324.

Magnetic tape may move in forward or reverse over the air bearing surface 330 along a direction indicated by double ended arrow 332. Active region 346 is positioned in an upper portion of the chiplet 322 and may include one or more readers and/or writers therein that are coupled to one or more pads such as bonding pad 324 through wiring such as trace 344. Closure 340 is positioned on the left side of the illustrated structure.

As illustrated in FIG. 3, an EMI shield 336 may be embedded between the active region 346 and the substrate 326 in chiplet 322 of module 320. The EMI shield 336 may be formed from any suitable EMI shielding material such as those described above, for example, permalloy, and may have a thickness such as described above, including, for example, a thickness in a range of about 500 nm to about 5000 nm, with certain embodiments about 2000 nm in thickness. As seen in FIG. 3, the EMI shield thickness refers to the distance between the dotted lines indicated by arrows W and W'.

The EMI shield 336 embedded in the chiplet 322 may be positioned between the active region 346 and the substrate 326, within an insulating region 338 of the chiplet 322. The insulating region 338 may be formed from any suitable insulating material including, but not limited to, a hard material such as aluminum oxide (Al$_2$O$_3$). The insulating region 338 layer may be formed using any suitable technique, such as carrying out a plurality of deposition operations using lithography to form sub-regions including, for example, undercoat and overcoat regions using a lithographic processes. An undercoat region is an insulating region generally positioned between the active area and the substrate, and an overcoat region is an insulating region generally positioned between the active area and the closure. The underfill and the overfill may each be formed to include a plurality of layers of material.

Figure 4:
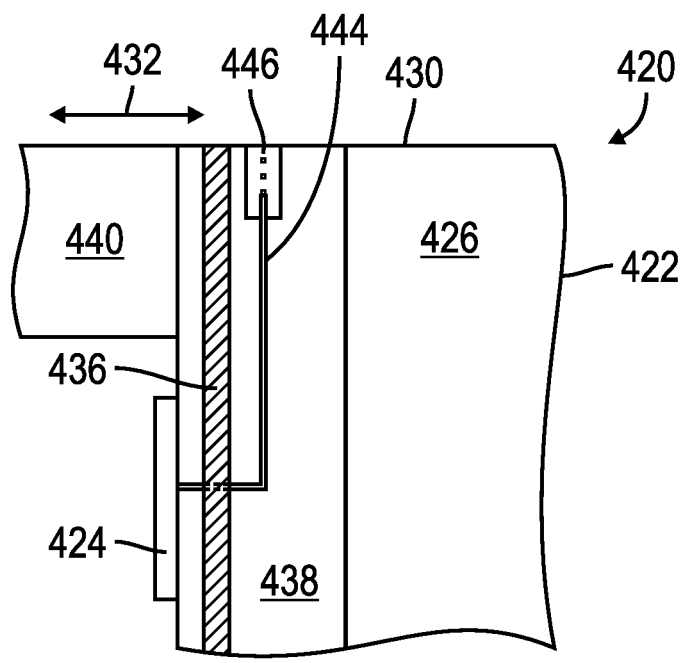
FIG. 4 illustrates a portion of a chiplet in accordance with certain embodiments.

FIG. 4 illustrates a cross-sectional view of a portion of a module 420 showing certain layers in the chiplet 422 in accordance with certain embodiments, that is similar in certain features to the portion of the module 320 illustrated in FIG. 3. The chiplet 422 may be mounted on a base (not shown) through which wiring may be attached to the module 420 at, for example, bonding pad 424.

Magnetic tape may move in forward or reverse over the air bearing surface 430 along a direction indicated by double ended arrow 432. Active region 446 is positioned in an upper portion of the chiplet 422 and may include one or more readers and/or writers therein that are coupled to the bonding pad 424 through wiring trace 444.

As illustrated in FIG. 4, an EMI shield 436 may be embedded in the chiplet 422 of module 420. A difference between the chiplet 322 illustrated in FIG. 3 and the chiplet 422 illustrated in FIG. 4 is that the EMI shield 436 embedded in the chiplet 422 in FIG. 4 is positioned between the active region 446 and the closure 440. For reasons including, but not limited to, ease of processing, maximum EMI protection, space limitations, and the layout of other modules, the location of the EMI shield embedded within the chiplet may be varied.

The EMI shield 436 may be formed from any suitable EMI shielding material and have a thickness such as described above in connection with FIGS. 2-3. The EMI shield 436 embedded in the chiplet 422 may be positioned within an insulating region 438. The insulating region 438 may be formed from any suitable insulating material as discussed above in connection with FIGS. 2-3.

In certain embodiments the EMI shield embedded in the chiplet may be electrically coupled to an external ground. Such a connection may act to inhibit tribocharging and corrosion, and lead to greater device reliability. Depending on the location of the embedded EMI shield in relation to other features, electrical connection may be made to a variety of locations. For a chiplet 322 such as that illustrated in FIG. 3, in certain embodiments the embedded EMI shield 336 may be electrically coupled to the substrate 326. For a chiplet 422 such as that illustrated in FIG. 4, in certain embodiments the embedded EMI shield 436 may be coupled to the closure 440, the trace 444, or the pad 424.

Figure 5:
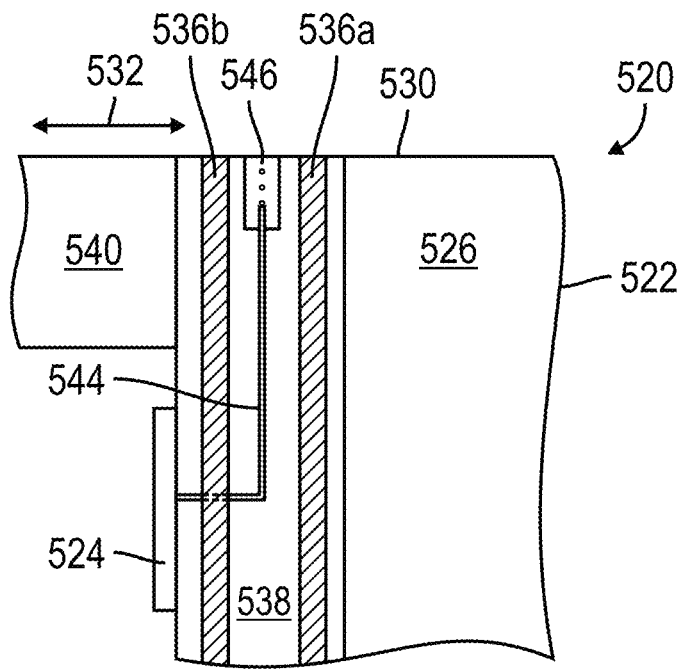
FIG. 5 illustrates a portion of a chiplet in accordance with certain embodiments.

FIG. 5 illustrates a cross-sectional view of portion of a module 520 showing certain layers in the chiplet 522 in accordance with certain embodiments, that is similar in certain features to the portions of modules 320 and 420 illustrated in FIGS. 3-4. The chiplet 522 may be mounted on a base (not shown) through which wiring may be attached to the module 520 at, for example, bonding pad 524.

Magnetic tape may move in forward or reverse over the air bearing surface 530 along a direction indicated by double ended arrow 532. Active region 528 is positioned in an upper portion of the chiplet 522 and may include one or more readers and/or writers therein that are coupled to the bonding pad 524 through wiring trace 544.

As illustrated in FIG. 5, an EMI shield 536a, 536b may be embedded within an insulation region 538 in the chiplet 522 of the module 520. A difference between the chiplet 522 illustrated in FIG. 5 and the chiplets 322, 422 illustrated in FIGS. 3-4 is that EMI shield 536a, 536b in FIG. 5 includes two embedded portions, with EMI shield 536a positioned between the active region 528 and the substrate 526, and EMI shield portion 536b positioned between the active region 528 and the closure 540. Multiple embedded EMI shields 536a, 536b may provide for additional EMI protection. Various features including, for example, the insulating regions 538 and the EMI shield 536a and EMI shield 536b embedded in the chiplet 522 may be formed from materials used and include similar dimensions to those discussed above in connection with FIGS. 2-4.

Figure 6:
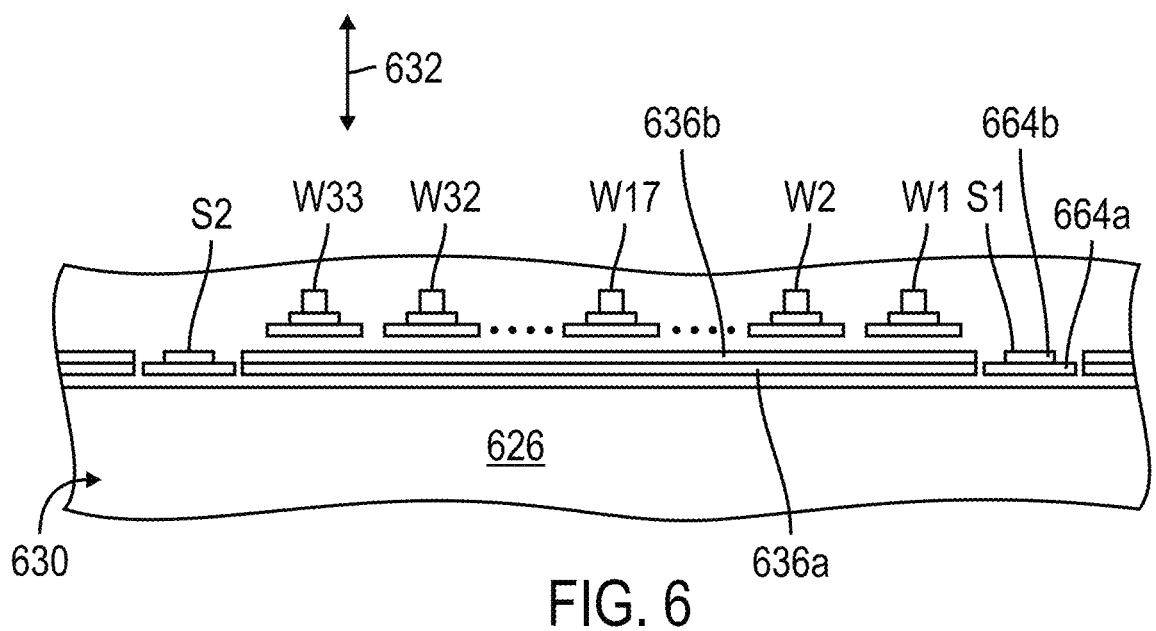
FIG. 6 illustrates components on an air bearing surface in accordance with certain embodiments.

Embodiments may include a plurality of elements distributed across an air bearing side of a module so that multiple tracks on a tape may be read from and/or written to. Certain embodiments utilize groups of 33 write elements extending along the air bearing surface. FIG. 6 illustrates a representation of such an embodiment, showing the position on an air bearing surface 630 of a group of writers W1, W2, W17, W32 and W33, together with servo readers S1 and S2. The servo readers ("servos") S1 and S2 are positioned on the outside of the array of writer elements. The servos S1, S2 include shields 664a, 664b on either side of a thin sensor element. The servos read servo tracks on the tape. Signals from the servos are used to keep writers and readers aligned with tracks during operations, as known in the art.

Magnetic tape may move in forward or reverse over the air bearing surface 632 along a direction indicated by double ended arrow 632. The servo readers S1 and S2 are positioned closer to the substrate 626 than the writers W1, W2, W17, W32 and W33. The servo readers S1 and S1 include servo shield 664a, 664b. For servo operations the servo shields 664a, 664b are formed to be limited in length. However, in accordance with certain embodiments, during the deposition of the servo shields 664a, 664b additional material may be deposited along an additional length during the same deposition operation to form the EMI shield 636a, 636b. While the embodiment of FIG. 6 shows the EMI shield 636a, 636b spaced apart from the servo shield 664a, 664b, in other embodiments it may be connected thereto. By making the EMI shield 636a, 636b part of the same layer(s) as the servo shields 664a, 664b space may be saved within the structure of the chiplet and using the same material and deposition operations enables efficient processing.

In certain embodiments, the embedded EMI shield may be formed to include only one layer, so that the embedded EMI shield is formed during the deposition of only one of the servo shields 664a, 664b.

Figure 7:
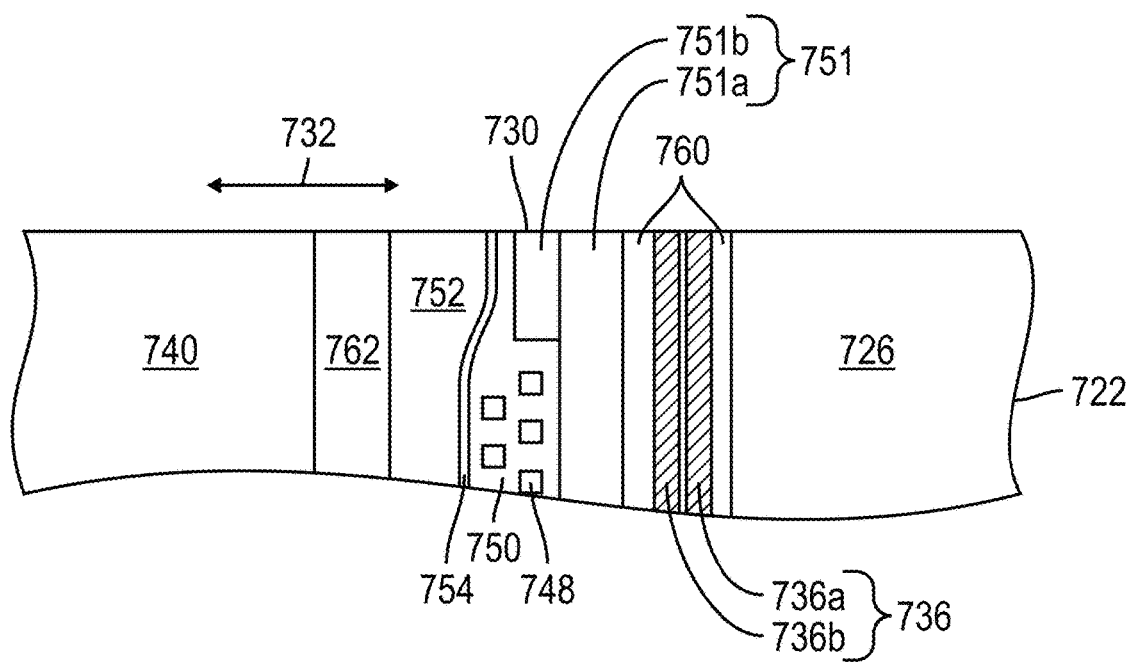
FIG. 7 illustrated a portion of a chiplet in accordance with certain embodiments.

FIG. 7 illustrates a cross-sectional view of certain layers in an upper portion of a chiplet 722 in accordance with certain embodiments. The chiplet 722 is in some ways similar to those described above, with a more detailed view of certain features. The chiplet 722 includes wafer or substrate 726, and an undercoat region 760 thereon in which EMI shield 736 is embedded. The EMI shield 736 may be formed to include a plurality of layers. The EMI shield 736 embedded in layer 760 in FIG. 7 includes embedded EMI shield 736a and EMI shield 736b. This structure may be formed in certain embodiments by depositing the undercoat layer 760 in multiple operations, with the EMI shield 736a and EMI shield 736b being deposited between undercoat layer deposition operations. The deposition of the EMI shield 736 may in certain embodiments be carried out as other components such as servo shields are formed, as described above in connection with FIG. 6. By depositing the same material used for the servo shields to extend along an additional length of the module, such material creates the EMI shield 736 for EMI protection.

FIG. 7 also illustrates the undercoat region 760, which may be formed from any suitable insulating material including, but not limited to, aluminum oxide ($Al_2O_3$). The shield 736 may be formed from materials used and include similar dimensions to those discussed above.

The active region in FIG. 7 comprises a writer. The writer includes pole regions 751, 752 and coil region including coils sandwiched between undercoat and overcoat regions. Any suitable processing such as lithography may be carried out to form the various writer layers in the active region between the undercoat 760 and the overcoat 762. The pole region 751 is formed as plurality of layers, with pole region 751a formed on the undercoat layer 760 and pole region 751b formed on part of pole region 751a. One or more coils such as a pancake coil 748 may be formed in an insulating region 750 between the pole region 751 and another pole region 752. The pole region 751b may be positioned between a coil 748 and the air bearing surface 730. A narrow portion of the insulating region 750 extends adjacent to the air bearing surface 730. A magnetic liner layer 754 may be formed between the insulating area 750 and the pole region 752.

The pole regions 751, 752 may be formed from any suitable material, including, but not limited to, a Ni—Fe alloy including 45% Ni and 55% Fe. The insulating region 750 may be formed from any suitable material including, but not limited to, $Al_2O_3$. An overcoat 762 may be positioned between the pole region 752 and the closure 740. The overcoat 762 may be formed from any suitable material, including, but not limited to, $Al_2O_3$. The closure 740 may be coupled to the overcoat 662 using a suitable mechanism, including, but not limited to, an adhesive.

Figure 8:
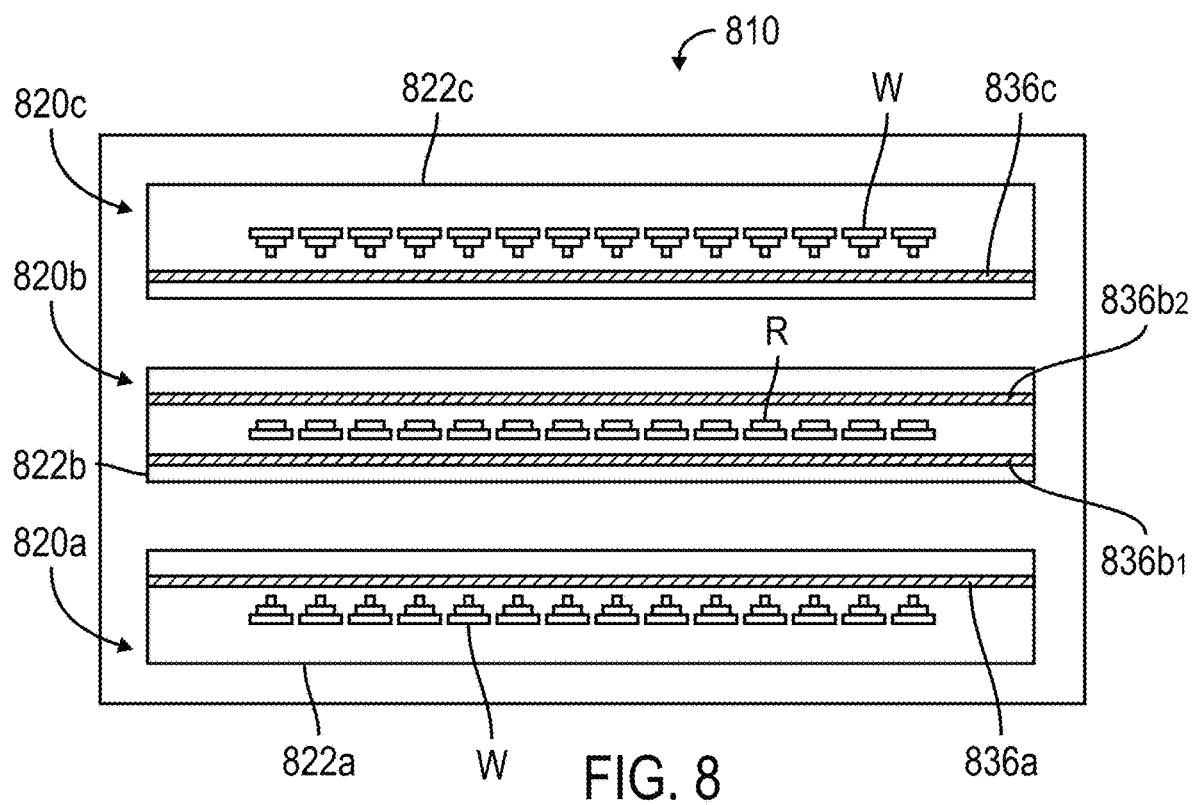
FIG. 8 illustrates the position of certain components on the air bearing side of a tape head in accordance with certain embodiments.

The configuration of a tape head may include one or more modules including various combinations of readers and writers. FIG. 8 illustrates an embodiment of tape head 810 including three modules 820a, 820b, 820c, with middle or inner module 820b including a plurality of readers R and outer modules 820a, 820c including a plurality of writers W. The configuration of FIG. 8 includes two embedded EMI shields between the writers W and readers R, with the inner module 820b including EMI shield $836b_1$ and EMI shield $836b_2$ on either side of the readers. Outer module 820a has shield 836a positioned between the writers W in module 820a and the module 820b. Similarly, outer module 820c has shield 836c positioned between the writers W in module 820c and the module 820b.

Another way to describe the layout is that within the module 820a, the writers W are covered on one side by the embedded EMI shield 836a. Within the module 820b, the readers R are covered on one side by the embedded EMI shield $836b_1$ and covered on the opposite side by the embedded shield $836b_2$. Within the module 820c, the writers W are covered on one side by the embedded EMI shield 836c. The number and layout of EMI shields embedded in each module is not limited to those illustrated in FIG. 8 and may include zero to a plurality of shields on each module.

Figure 9:
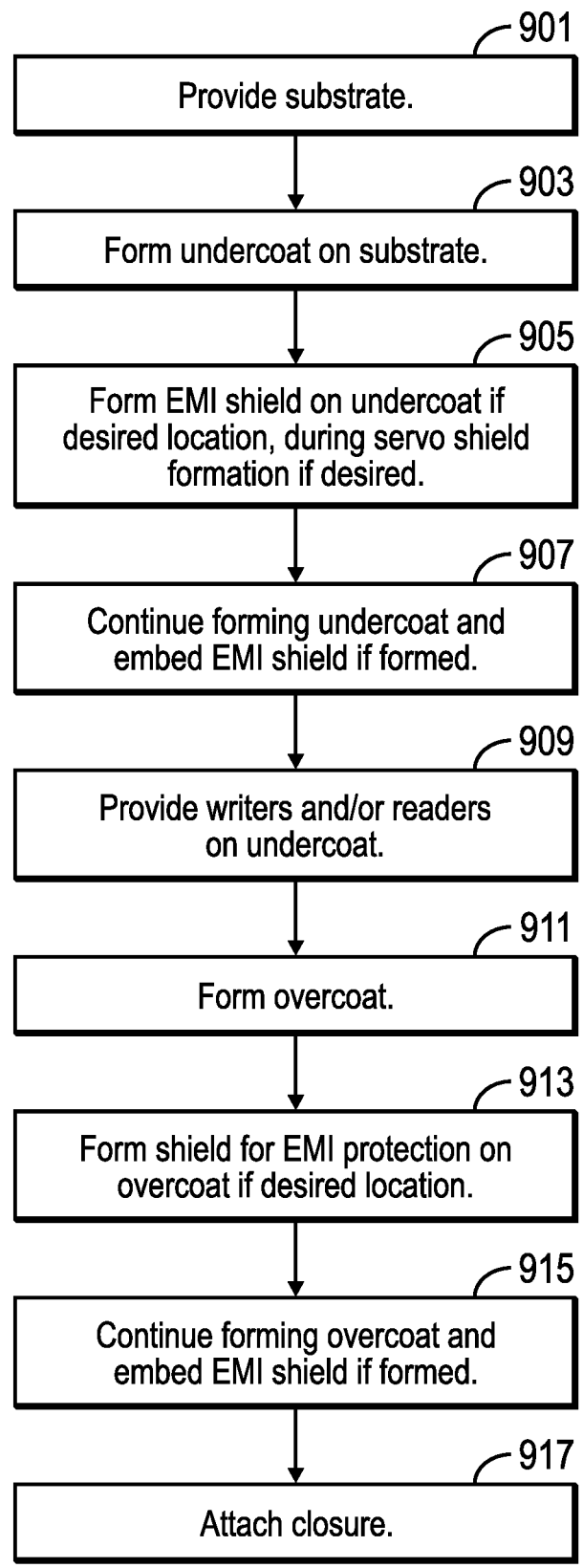
FIG. 9 is a flow chart of operations in accordance with certain embodiments.

Embodiments also relate to methods for forming one or more EMI shields embedded within a chiplet on a module for use in a magnetic head. FIG. 9 is a flowchart of operations for forming an EMI shield structure in accordance with certain embodiments. Some of the operations have been discussed above in connection with embodiments illustrated in other figures. Block 901 is providing a substrate from a material such as AlTiC on which a plurality of layers will be deposited. Block 903 is forming an undercoat layer by, for example, by depositing an insulating material such as Al$_2$O$_3$ on the substrate as discussed above in connection with FIG. 2. Box 905 is forming an EMI shield on the undercoat layer if the location is desired. The EMI shield may be formed, for example, by depositing a material such as permalloy on the undercoat. Block 907 is continuing to form the undercoat so that if formed, the EMI shield is embedded in the undercoat material. Block 909 is providing readers and/or writers on the undercoat material using any suitable operations, for example, lithographic deposition and etching processes. Block 911 is forming an overcoat layer on the readers and/or writers. If desired, the overcoat layer may be formed from the same material as the undercoat layer. Block 913 is forming an EMI shield on the overcoat, if the location for the EMI shield is desired. Block 915 is continuing to form the overcoat so that the EMI shield, if formed, is embedded in the overcoat Block 917 is coupling a closure to the structure including the undercoat. The chiplet structure including the layers described above may be coupled to a base, with the resultant structure being a module. One or more modules may be coupled together to form a tape head.

As discussed above, embodiments may inhibit or suppress EMI during operation of a tape head.

In the described embodiments, any variables R, W, etc., when used with different elements may denote a same or different instance of that element.

The terms "an embodiment", "embodiment", "embodiments", "the embodiment", "the embodiments", "one or more embodiments", "some embodiments", "certain embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

Aspects of the present invention are described herein with reference to flowchart illustrations and/or block diagrams according to embodiments of the invention.

Individual blocks may be optional. Inventive subject matter may be found in each block individually or in groups of the blocks. It will be understood that each block of the flowchart illustrations and/or block diagrams, and combinations of blocks in the flowchart illustrations and/or block diagrams, can be implemented by a machine system to manufacture and implement embodiments as described herein.

The foregoing description of various embodiments of the invention has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. A device for use in a magnetic tape head, comprising:
a chiplet including a substrate and at least one writer positioned on the substrate; and
an electromagnetic interference shield embedded in the chiplet, the electromagnetic interference shield configured to inhibit electromagnetic interference during operation of the at least one writer; and
an undercoat region on a surface of the substrate, the undercoat region comprising an insulating material, the undercoat region extending between the substrate and the at least one writer;
wherein at least a portion of the electromagnetic interference shield is positioned between the surface of the substrate and the at least one writer;
wherein the at least a portion of electromagnetic interference shield is sandwiched directly between a first part of the undercoat region and a second part of the undercoat region, the first part positioned between the at least a portion of the electromagnetic interference shield and the surface of the substrate, the second part positioned between the at least a portion of the electromagnetic interference shield and the at least one writer; and
wherein no reader is positioned between the at least one writer and the substrate along a line orthogonal to the surface of the substrate extending through the at least one writer.

2. The device of claim 1, wherein the chiplet further comprises a servo including a servo shield, and wherein at least a portion of the electromagnetic interference shield comprises a common material as the servo shield.

3. The device of claim 1, wherein the chiplet further comprises a servo including a servo shield, and wherein at least a portion of the electromagnetic interference shield comprises an extension of the servo shield.

4. The device of claim 1, further comprising:
an overcoat region comprising an insulating material, the at least one writer positioned between the overcoat region and the undercoat region;
wherein the at least a portion of the electromagnetic interference shield that is embedded in the undercoat region between the substrate and the at least one writer is a first portion, the electromagnetic interference shield further comprising a second portion embedded in the overcoat region.

5. The device of claim 1, wherein the chiplet includes an air bearing surface over which a magnetic tape may move during reader operation, and wherein the electromagnetic interference shield extends to the air bearing surface.

6. The device of claim 1, wherein the electromagnetic interference shield is positioned to cover the at least one writer between the substrate and the at least one writer.

7. The device of claim 6, wherein the chiplet further comprises a servo including a servo shield positioned between the substrate and the at least one writer, and wherein at least a portion of the electromagnetic interference shield comprises an extension of the servo shield.

8. The device of claim 1, wherein the chiplet defines a height, and the electromagnetic interference shield extends the height of the chiplet.

9. The device of claim 1, wherein the chiplet defines a depth, and the electromagnetic interference shield extends the depth of the chiplet.

10. The device of claim 1, wherein the electromagnetic interference shield is electrically coupled to an electrical ground.

11. The device of claim 1, wherein the chiplet is coupled to a support to form a module.

12. The device of claim 11, wherein the module is a first module, wherein the device further comprises:
a second module including at least one reader; writer; and
a third module including at least one writer;
wherein the second module is positioned between the first module and the third module.

13. The device of claim 1, wherein the chiplet further comprises at least one bonding pad for electrical connection to the at least one writer, wherein the electromagnetic interference shield is positioned to cover the at least one bonding pad, and wherein the electromagnetic interference shield is positioned between the substrate and the at least one bonding pad.

14. A device comprising:
a module comprising a substrate and a row of writers on a surface of the substrate;
an undercoat region on a surface of the substrate, the undercoat region comprising an insulating material, the undercoat region extending between the substrate and the row of writers;
a closure positioned so that the row of writers is positioned between the closure and the substrate;
an electromagnetic interference shield configured to inhibit electromagnetic interference, wherein at least a portion of the electromagnetic interference shield is positioned between the surface of the substrate and the row of writers;
wherein the at least a portion of the electromagnetic interference shield is embedded between a first part of the undercoat region and a second part of the undercoat region, the first part positioned between the electromagnetic interference shield and the surface of the substrate, the second part positioned between the electromagnetic interference shield and the row of writers; and
wherein no row of readers is positioned between the row of writers and the substrate.

15. The device of claim 14, wherein the module further comprises a servo including a servo shield, and wherein at least a portion of the electromagnetic interference shield comprises a common material as the servo shield.

16. The device of claim 14, wherein the module further comprises a servo including a servo shield, and wherein at least a portion of the electromagnetic interference shield comprises an extension of the servo shield.

17. The device of claim 14, wherein the module is a first module, the device further comprising a second module including a substrate and a row of writers, and a third module including a substrate and a row of readers, wherein the third module is positioned between the first module and the third module.

18. The device of claim 14, further comprising:
an overcoat region comprising an insulating material, the row of writers positioned between the overcoat region and the undercoat region, the overcoat region positioned between the row of writers and the closure;
wherein the at least a portion of the electromagnetic interference shield that is embedded between a first part of the undercoat region and a second part of the undercoat region is a first portion, the electromagnetic interference shield further comprising a second portion embedded in the overcoat region between the row of writers and the closure so that the overcoat region extends between the second portion of the electromagnetic interference shield and the closure, and the overcoat region extends between the second portion of the electromagnetic interference shield and the row of writers.

19. The device of claim 14, wherein the module includes an air bearing surface over which a magnetic tape may move during reader operation, and wherein the electromagnetic interference shield extends to the air bearing surface.

20. The device of claim 14, further comprising at least one bonding pad for electrical connection to the row of writers, wherein the electromagnetic interference shield is positioned to cover the at least one bonding pad.

* * * * *